(12) United States Patent
Jeong et al.

(10) Patent No.: US 10,110,260 B2
(45) Date of Patent: Oct. 23, 2018

(54) TRANSMITTER FOR WIRELESS COMMUNICATIONS

(71) Applicant: FCI INC., Gyeonggi-do (KR)

(72) Inventors: SeongHun Jeong, Gyeonggi-do (KR); Heeyoung Yoo, Gyeonggi-do (KR)

(73) Assignee: FCI INC., Bundang-Gu, Seongnam-si, Gyeonggi-Do (KR)

( * ) Notice: Subject to any disclaimer, the term of this patent is extended or adjusted under 35 U.S.C. 154(b) by 0 days.

(21) Appl. No.: 15/581,767

(22) Filed: Apr. 28, 2017

(65) Prior Publication Data

US 2018/0175891 A1 Jun. 21, 2018

(30) Foreign Application Priority Data

Dec. 21, 2016 (KR) .................. 10-2016-0175621

(51) Int. Cl.
*H04B 1/40* (2015.01)
*H04B 1/02* (2006.01)
*H04B 1/04* (2006.01)

(52) U.S. Cl.
CPC ....... *H04B 1/02* (2013.01); *H04B 2001/0408* (2013.01); *H04B 2001/0491* (2013.01)

(58) Field of Classification Search
CPC ........ H04B 1/02; H04B 1/005; H04B 1/0483; H04B 1/0057; H04B 1/406
USPC .......................................................... 455/75
See application file for complete search history.

(56) References Cited

U.S. PATENT DOCUMENTS

| | | | | |
|---|---|---|---|---|
| 6,424,817 B1 * | 7/2002 | Hadden | ............... | H04B 7/18517 455/3.02 |
| 7,164,895 B2 * | 1/2007 | Okanobu | ............... | H04B 1/005 375/327 |
| 2003/0153348 A1 * | 8/2003 | Lahlum | ............... | H04B 1/406 455/575.7 |
| 2014/0016690 A1 * | 1/2014 | Chang | ............... | H04L 25/03885 375/232 |

* cited by examiner

*Primary Examiner* — Eugene Yun
(74) *Attorney, Agent, or Firm* — Muncy, Geissler, Olds & Lowe, P.C.

(57) ABSTRACT

A transmitter for wireless communications can remove a signal having an image frequency without using a band pass filter, and can be downsized such that it is integrated into a single chip on an integrated circuit board.

8 Claims, 9 Drawing Sheets

TRANSMITTER FOR WIRELESS COMMUNICATIONS

CROSS-REFERENCE TO RELATED APPLICATIONS

This application claims the priority of Korean Patent Application No. 10-2016-0175621 filed on 2016 Dec. 21, in the Korean Intellectual Property Office, the disclosure of which is hereby incorporated by reference in its entirety.

BACKGROUND

1. Technical Field

An exemplary embodiment of the present disclosure relates to a transmitter for wireless communications.

2. Description of the Related Art

The statements in this section merely provide background information related to an exemplary embodiment of the present disclosure and may not constitute prior art.

FIG. 1 is a diagram of a conventional transmitter for wireless communications that receives an in-phase (I) signal and a quadrature phase (Q) signal.

Typically, a transmitter for wireless communications includes a first amplification unit 110, a mixer unit 120, a local oscillation unit 130, a first filter unit 140, a second amplification unit 150, and an antenna unit 160, to transmit data to a counterpart receiver, as shown in FIG. 1.

The first amplification unit 110 includes a pair of amplifiers, which receive and amplify an I phase signal and a Q phase signal, respectively.

The mixer unit 120 includes a pair of mixers which mix the I phase signal with the Q phase signal.

The mixer unit 120 receives an amplified baseband signal and performs upconversion on the received signal so that it has a higher frequency for wireless transmission.

The frequency upconversion is performed by mixing the signal from the local oscillation unit 130 with the amplified phase signal transmitted from the first amplification unit 110 by the mixer unit 120.

The mixer unit 120 transmits the upconverted signal to the first filter unit 140.

The first filter unit 140 removes undesired signal components from the received up-converted signals and transmits it to the second amplification unit 150. The first filter unit 140 may be a bandpass filter unit.

The second amplification unit 150 amplifies remaining signal components after the first filter unit 140 and transmits the amplified signal to the antenna unit 160 to perform wireless transmission.

FIGS. 2A to 2D are diagrams that conceptually illustrates a method of upconverting a frequency by using the transmitter for wireless communications shown in FIG. 1.

An input signal including a signal having the frequency of +fa and a signal having the frequency of −fa, which is the image frequency of the signal, is input to the mixer unit 120. The mixer unit 120 receives the signal of the $f_{LO}$ frequency from the local oscillation unit 130 and performs frequency upconversion. Since there is the image frequency, the frequency-upconverted input signal has the waveform as shown in FIG. 2B.

As a result of the frequency upconversion, a signal having the frequency of $f_{LO}$−fa is generated as well as a signal having frequency of $f_{LO}$+fa. Assuming that the desired signal has the frequency of $f_{LO}$+fa, it is necessary to receive the signal having the frequency of $f_{LO}$−fa.

To this end, various types of filters may be employed.

The first filter unit 140 removes undesired signal components from the frequency-upconverted signal and outputs the remaining components. The output waveform is shown in FIG. 2D.

FIGS. 3A to 3D are diagrams that conceptually illustrate an example of a method of upconverting a frequency by using the transmitter for wireless communications shown in FIG. 1.

In FIG. 3, the frequencies +fa and −fa are 2 GHz and −2 GHz, respectively, and the frequency $f_{LO}$ is 13 GHz. The undesired signal has the frequency of 11 GHz.

In this example, the first filter unit 140 is a bandpass filter that has a center frequency of 15 GHz and a passband width of approximately 1 GHz.

Incidentally, in order to fabricate a bandpass filter having the center frequency of 15 GHz and the passband width of 1 GHz, inductors and capacitors employed thereby should have very small values.

However, it is practically almost impossible to implement such an inductor having such a small value, for example, an inductance of several nH, and a capacitor having a capacitance of several pF in a single integrated circuit for a wireless communication transmitter.

Therefore, what is required is a novel transmitter for wireless communications having a size allowing integration while still removing undesired signals, e.g., signals having an image frequency.

SUMMARY

It is an object of the present disclosure to provide a transmitter for wireless communications capable of removing a signal having an image frequency without using a bandpass filter.

It is another object of the present disclosure to provide a transmitter for wireless communications capable of using two or four phase signals as input signals by employing a polyphase filter.

In accordance with one aspect of the present disclosure, a transmitter for wireless communications includes: a filter unit configured to selectively pass a first frequency band that is one frequency band of an input signal and block a second frequency band that is another frequency band of the input signal; a local oscillation unit configured to generate an oscillation signal having a predetermined oscillation frequency and a predetermined magnitude; a mixer unit configured to receive a filter signal output from the filter unit and the oscillation signal to convert the filter signal so that it has a frequency higher than the first frequency band; an amplification unit configured to amplify an output from the mixer unit; and an antenna unit configured to radiate an amplified signal received from the amplification unit in the form of an electromagnetic wave.

According to an exemplary embodiment of the present disclosure, a transmitter for wireless communications can remove a signal having an image frequency without using a bandpass filter.

According to another exemplary embodiment of the present disclosure, a transmitter for wireless communications can use two or four phase signals as input signals by employing a polyphase filter.

According to yet another exemplary embodiment of the present disclosure, a transmitter for wireless communications operating in a millimeter band (mmWave, 10 GHz or higher frequency band) can be implemented into an integrated circuit, so that at least one inductor that occupies a large area in an integrated circuit can be eliminated, thereby remarkably reducing the area of the integrated circuit.

DETAILED DESCRIPTION

Figure 1:
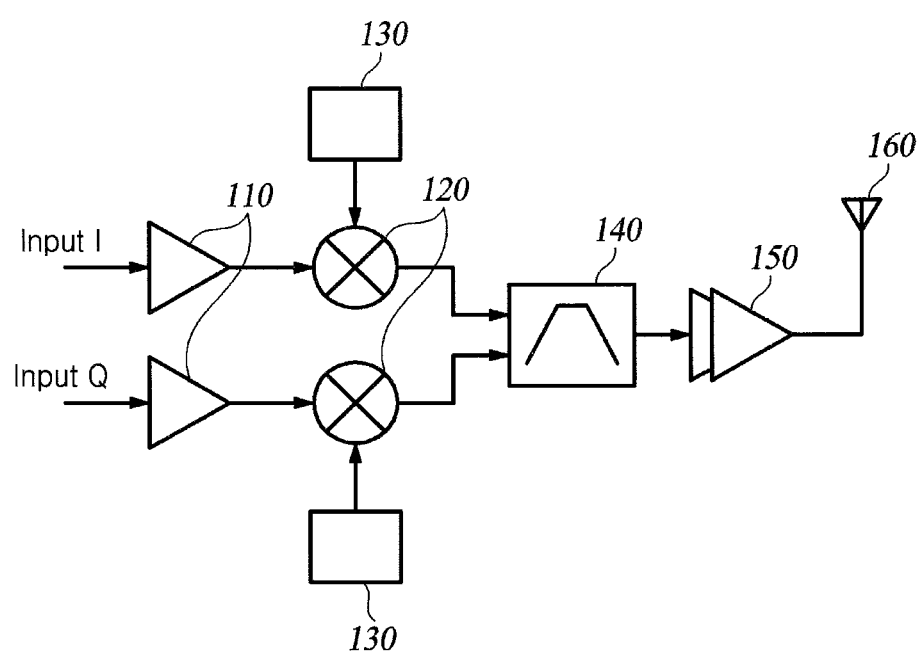
FIG. 1 is a diagram of a conventional transmitter for wireless communications that receives an in-phase (I) signal and a quadrature phase (Q) signal.
Figure 2A:
FIG. 2A is a diagram that conceptually illustrates a method of upconverting a frequency by using the transmitter for wireless communications shown in FIG. 1.
Figure 2B:
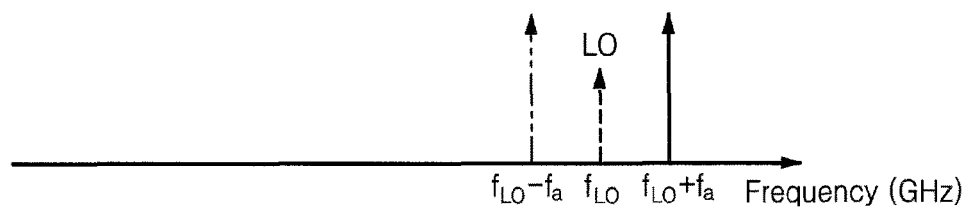
FIG. 2B is another diagram that conceptually illustrates the method of upconverting a frequency by using the transmitter for wireless communications shown in FIG. 1.
Figure 2C:
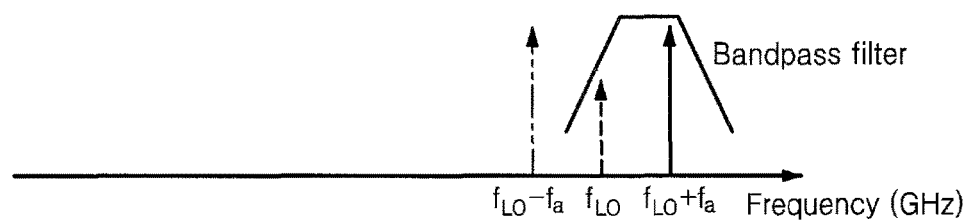
FIG. 2C is another diagram that conceptually illustrates the method of upconverting a frequency by using the transmitter for wireless communications shown in FIG. 1.
Figure 2D:
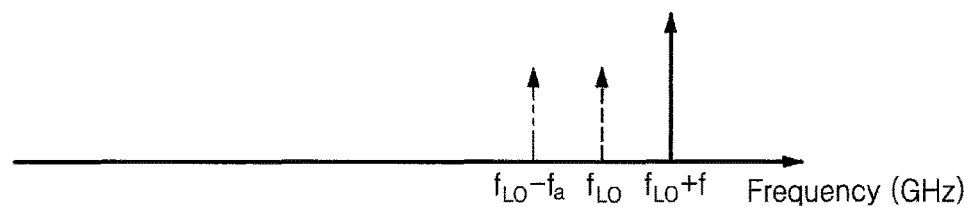
FIG. 2D is another diagram that conceptually illustrates the method of upconverting a frequency by using the transmitter for wireless communications shown in FIG. 1.
Figure 3A:
FIG. 3A is a diagram that conceptually illustrates an example of a method of upconverting a frequency by using the transmitter for wireless communications shown in FIG. 1.
Figure 3B:
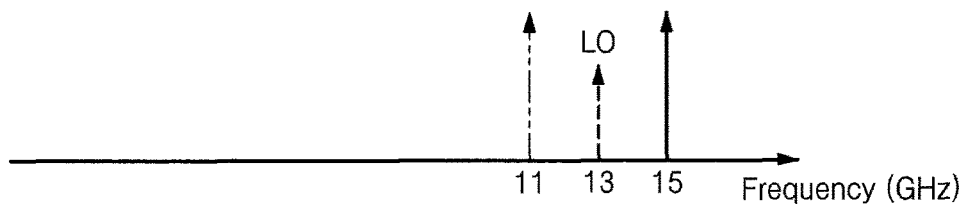
FIG. 3B is another diagram that conceptually illustrates an example of the method of upconverting a frequency by using the transmitter for wireless communications shown in FIG. 1.
Figure 3C:
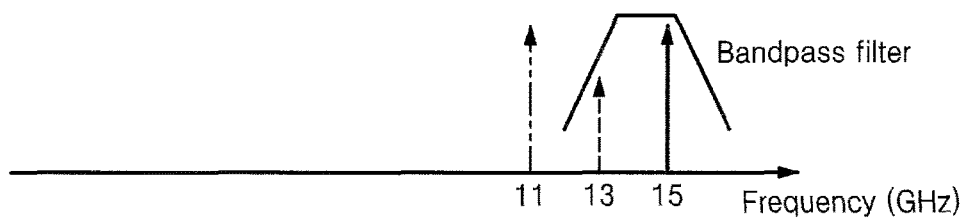
FIG. 3C is another diagram that conceptually illustrates an example of the method of upconverting a frequency by using the transmitter for wireless communications shown in FIG. 1.
Figure 3D:
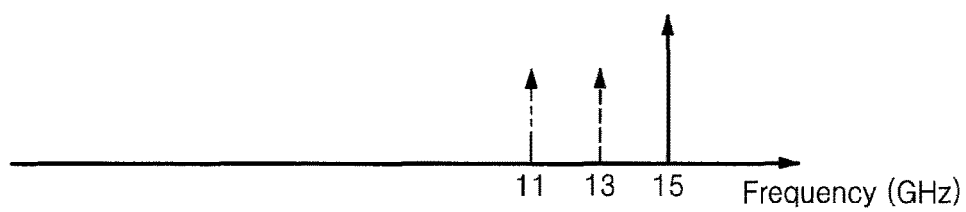
FIG. 3D is another diagram that conceptually illustrates an example of a method of upconverting a frequency by using the transmitter for wireless communications shown in FIG. 1.

Hereinafter, an exemplary embodiment of the present disclosure will be described in detail with reference to the accompanying drawings. Like reference numerals designate like elements throughout the drawings. For purposes of simplicity and clarity, detailed descriptions of well-known configuration or functionality may be omitted so as not to unnecessarily obscure the gist of the present disclosure.

In describing components of exemplary embodiments of the present disclosure, terms such as first, second, i), ii), (a), (b), etc., may be used. These terms are used to merely distinguish an element from another but not to limit the essential feature, order, sequence or the number of the element. Throughout the descriptions, the terms "comprising," "including," "having," and the like are intended to be inclusive and mean that there may be additional elements other than the listed elements, unless specifically stated otherwise.

Hereinafter, a transmitter according to an exemplary embodiment of the present disclosure will be described with reference to the accompanying drawings.

Figure 4:
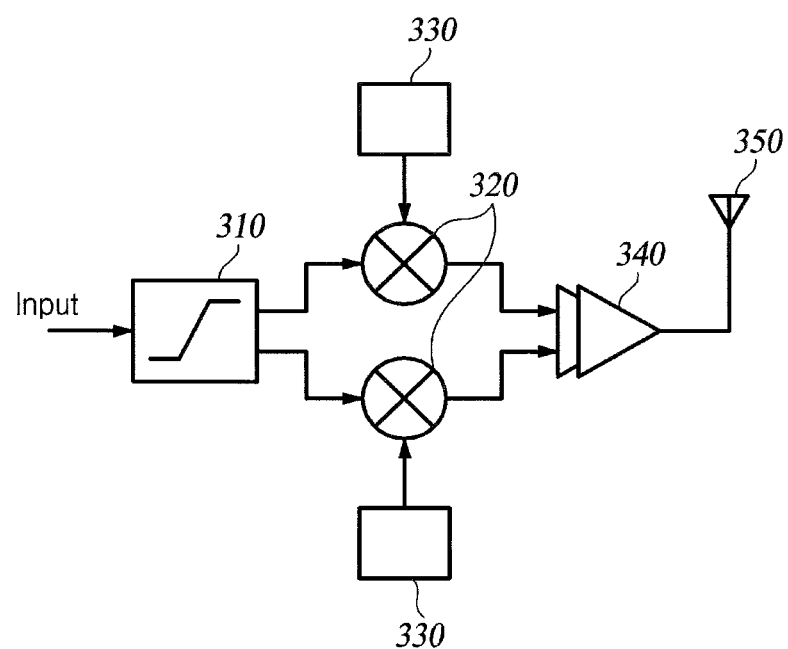
FIG. 4 is a diagram that conceptually illustrates a wireless communications transmitter according to an exemplary embodiment of the present disclosure.

FIG. 4 is a diagram that conceptually illustrates a transmitter according to an exemplary embodiment of the present disclosure.

A transmitter according to an exemplary embodiment of the present disclosure is characterized in that a signal, having an image frequency, can be removed without using a bandpass filter, that cannot be integrated in the transmitter for mobile communication.

Referring to FIG. 4, the transmitter for wireless communications includes a second filter unit 310, a mixer unit 320, a local oscillation unit 330, a second amplification unit 340, and an antenna unit 350.

The second filter unit 310 may include a plurality of passive elements such as a resistive element (resistor), a capacitive element (capacitor), and an inductive element (inductor).

The second filter unit 310 receives an I-phase signal and a Q-phase signal. The second filter unit 310 selectively passes signals in a first frequency band, e.g., one continuous frequency band above 500 MHz. In addition, the second filter unit 310 blocks signals in a second frequency band, e.g., one continuous frequency band below 1 GHz. That is, the second filter unit 310 may remove a signal component having an image frequency, which is an undesired signal, and output only a signal component having a necessary frequency band. The first frequency band and the second frequency band may be symmetric about a frequency on the frequency axis.

In addition, the second filter unit 310 may be a polyphase filter having the above-described characteristics.

In a series RC circuit formed by connecting a resistive element and a capacitive element in series, the voltage applied via the capacitive element lags the current by 90°, and lags the voltage via the resistive element by 90°. The polyphase filter is employed in combination with other circuit components to take advantage of these characteristics.

A first-order polyphase filter typically receives four signals and outputs four signals. A first input terminal, which is an input terminal, is connected to an output terminal via the resistive element and is connected to another output terminal via the capacitive element.

There is a 90° phase difference between the signal output across the resistive element and the signal output across the capacitive element.

A second input terminal, which is the other input terminal, receives a signal obtained by inverting the phase of the signal input to the first input terminal by 180°, and thus, there is a 90° phase difference between the signal output via the second input terminal and the resistive element and the second input terminal and the signal output via the capacitive element.

In addition, the second filter unit 310, the mixer unit 320, the local oscillation unit 330, the second amplification unit 340 and the antenna unit 350 may be integrated into a single chip on a single semiconductor substrate (monolithic integration).

Figure 5A:
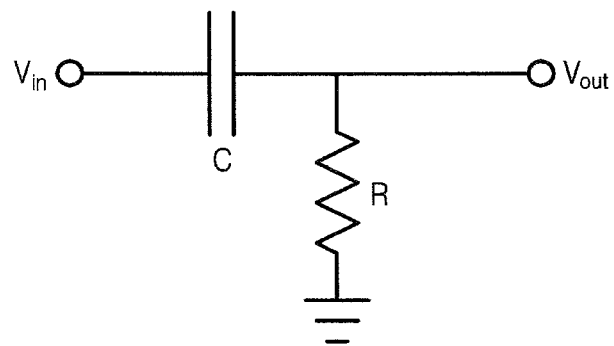
FIG. 5A is a circuit diagram of a high-pass filter (HPF) that illustrates operation of the polyphase filter according to an exemplary embodiment of the present disclosure.
Figure 5B:
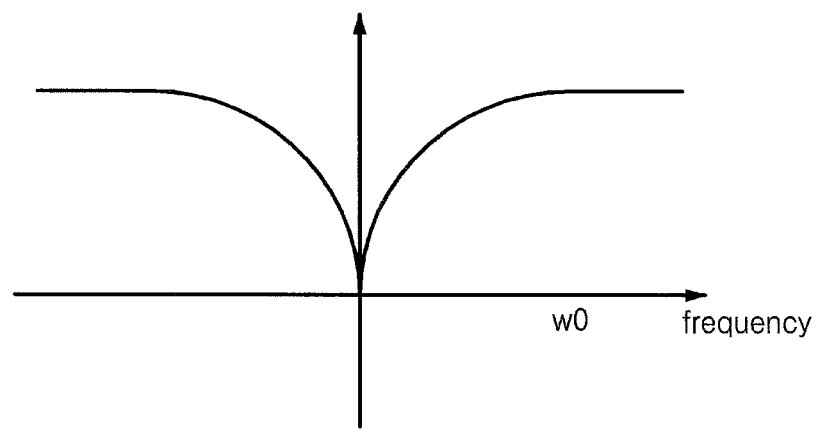
FIG. 5B is a frequency response characteristics graph.

FIG. 5A is a circuit diagram of a high-pass filter (HPF) for illustrating the operation of the polyphase filter according to an exemplary embodiment of the present disclosure. FIG. 5B is a frequency response characteristics.

As shown in FIG. 5A, the frequency response characteristic of the output voltage with respect to the input voltage for a circuit consisting of one capacitor and one resistor may be expressed by Equation 1.

$$\frac{V_{out}}{V_{in}} = \frac{sC}{s - \frac{1}{RC}} \quad \text{[Equation 1]}$$

where s denotes a complex variable, C denotes a capacitance of a capacitor, and R denotes a resistance of a resistance.

As shown in FIG. 5B, the frequency response value becomes infinite, i.e., the pole at which the denominator of the frequency response value becomes zero, when the value of s is 1/RC. The frequency response value becomes zero, i.e., the zero that makes the numerator of the frequency response value zero, when the value of s is zero, i.e., DC. Accordingly, the circuit of FIG. 6A operates as a high-pass filter that blocks a low-frequency component smaller than w0 and passes the high-frequency component.

Figure 6A:
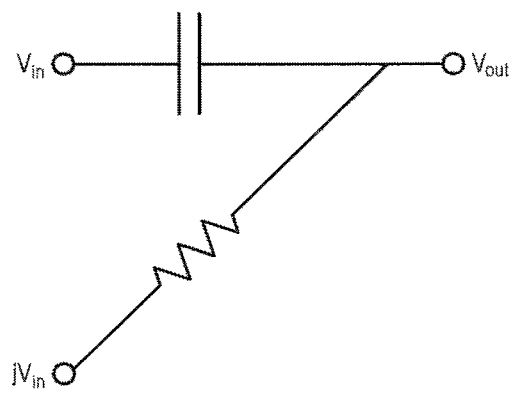
FIG. 6A is a schematic of a circuit that illustrates operation of a polyphase filter according to an exemplary embodiment of the present disclosure.
Figure 6B:
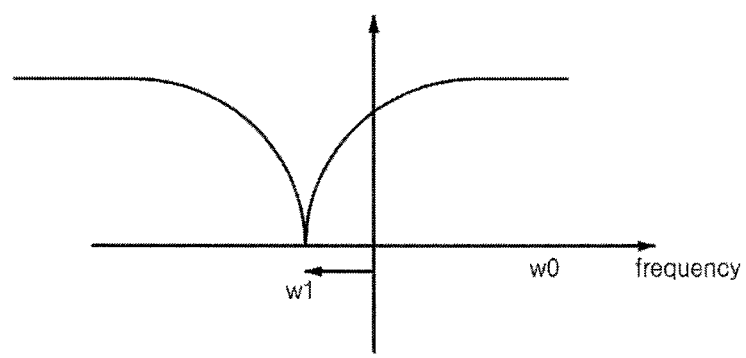
FIG. 6B is a frequency response characteristics graph.
Figure 6C:
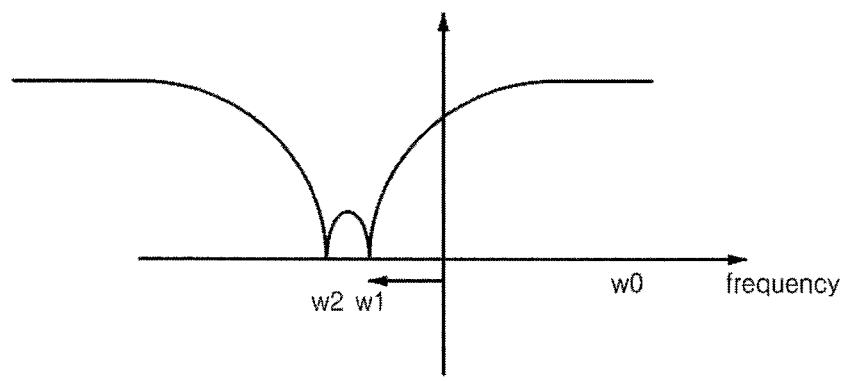
FIG. 6C is another frequency response characteristics graph.

FIGS. 6A to 6C are diagrams for illustrating the operation of a polyphase filter according to an exemplary embodiment of the present disclosure.

The high-pass filter of FIG. 6A has the same configuration as the high-pass filter of FIG. 5A but has different input values. This polyphase filter inputs signals having the phase difference of 90° therebetween to two input terminals and transitions a frequency value at which the frequency response value becomes zero.

The frequency response characteristic of the output voltage with respect to the input voltage in the polyphase filter shown in FIG. 6A may be expressed by Equation (2).

$$\frac{V_{out}}{V_{in}} = \frac{s + j\frac{1}{RC}}{s - \frac{1}{RC}} \quad \text{[Equation 2]}$$

where j denotes as a unit for expressing an imaginary part of a complex number, which is an imaginary number satisfying $j^2=1$.

The pole that makes the denominator of the frequency response value zero is obtained when the value of s is 1/RC. The frequency response value becomes zero, i.e., the zero that makes the numerator of the frequency response value zero is obtained when the value of s is –j/RC.

Thus, the circuit of FIG. 6A has the frequency response curve as shown in FIG. 6B, which has the same shape as the frequency response curve of FIG. 5B, but the zero point is shifted in the negative direction along the frequency axis by j/RC.

By connecting two of the circuit shown in FIG. 6A to form a second-order polyphase filter, a frequency response curve as shown in FIG. 6C can be obtained. By doing so, a component having a frequency between w2 and w1 would not pass and be blocked.

Figure 7:
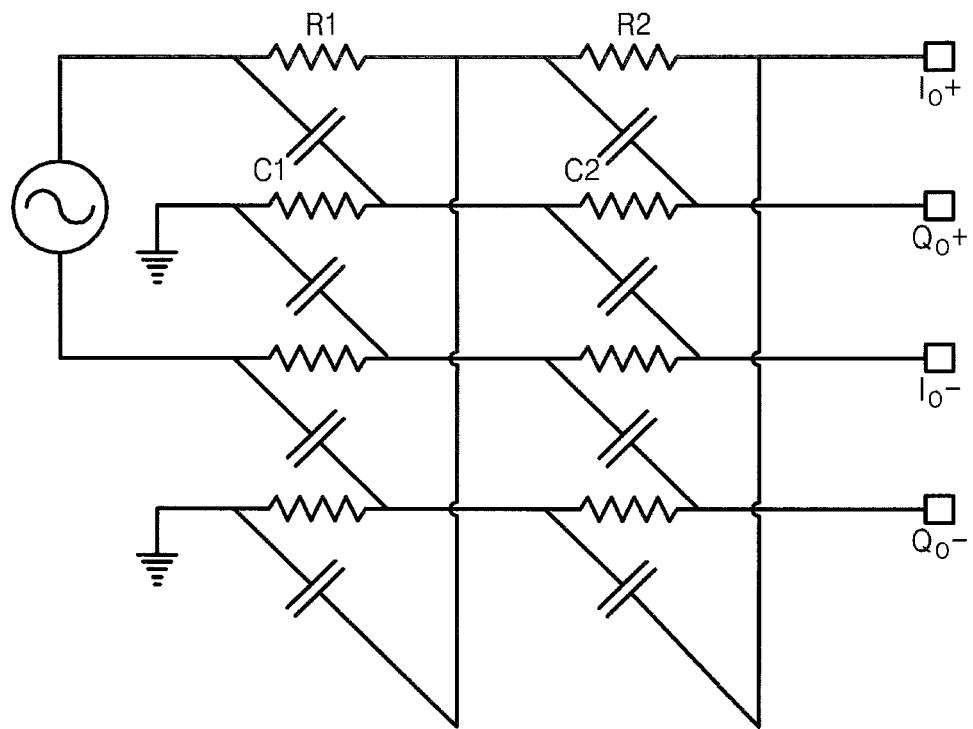
FIG. 7 is a circuit diagram of a polyphase filter according to an exemplary embodiment of the present disclosure.

FIG. 7 is a circuit diagram of a polyphase filter according to an exemplary embodiment of the present disclosure. The polyphase filter according to this exemplary embodiment of the present disclosure is a second-order polyphase filter that may receive two or four phase signals and output two or four phase signals.

Previously, it was difficult to integrate individual resistors or capacitors having RC time constant values for blocking an image signal having a frequency component of several tens of MHz used in a conventional communications system. In contrast, in the system using a frequency component of 1 GHz or more as a transmitter signal according to an exemplary embodiment of the present disclosure, a polyphase filter is more effective.

For example, to block frequency components below 2 GHz, the resistance of the resistor should be 500Ω and the capacitance of the capacitor should be 1 pF. More precisely, since the time constant which is the product of the resistance and the capacitance is related to the cut-off frequency, the reciprocal of the product of the resistance and the capacitance should be maintained to be the desired frequency value.

Accordingly, when the resistance of each of the plurality of resistors and the capacitance of each of the plurality of capacitors shown in the circuit diagram of FIG. 7 have 500Ω and 1 pF, the polyphase filter can block an image signal having a frequency component below 2 GHz.

On the other hand, to apply the band-pass filter used in the conventional communication system as shown in FIG. 1 to the frequency of the wireless communication transmitter according to an exemplary embodiment of the present disclosure, an inductor having an inductance of 0.1 nH or less and a capacitor having a capacitance value of 100 and or less are required. However, in current technology, it is difficult to integrate inductors and capacitors having such values into a single small chip for wireless communications.

FIGS. 8A to 8D are diagrams that conceptually illustrate a method of upconverting a frequency by using a wireless communication transmitter according to an exemplary embodiment of the present disclosure.

Figure 8A:
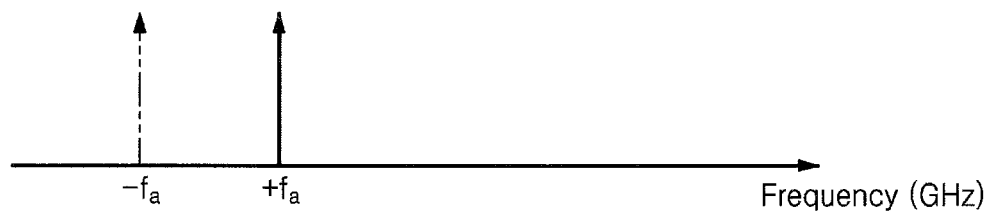
FIG. 8A is a diagram that conceptually illustrates a method of upconverting a frequency by using a wireless communication transmitter according to an exemplary embodiment of the present disclosure.
Figure 8B:
FIG. 8B is another diagram that conceptually illustrates the method of upconverting a frequency by using a wireless communication transmitter according to an exemplary embodiment of the present disclosure.
Figure 8C:
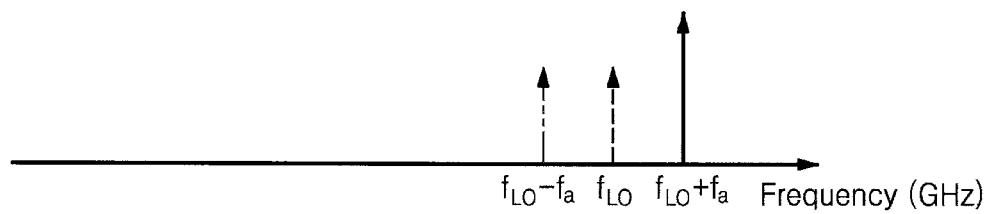
FIG. 8C is another diagram that conceptually illustrates the method of upconverting a frequency by using the wireless communication transmitter according to an exemplary embodiment of the present disclosure.

As shown in FIGS. 8A and 8B, when an input signal including a signal having the frequency of +fa and a signal having the frequency of –fa, which is an image frequency of the signal, is input to the second filter unit 310, the second filter unit 310 cuts out the signal having the frequency of –fa, while leaving the signal having the frequency of +fa.

The second filter unit 310 transmits the signal having the frequency of +fa to the mixer unit 320.

The mixer unit 320 receives the oscillation signal having the frequency of $f_{LO}$ from the local oscillation unit 130 and receives the signal having the frequency of +fa from the second filter unit 310. The mixer 320 mixes the two signals to perform frequency upconversion. The frequency-upconverted signal has the frequency of $f_{LO}$+fa, as shown in FIG. 6C.

In this case, since the signal, having the image frequency, is weak or hardly exists, it is not necessary to use a separate filter at the subsequent stage of the mixer 320 to filter them, as done conventionally.

The second amplifier 340 receives the frequency up-converted signal from the mixer unit 320. The second amplification unit 340 amplifies the received signal and transmits the amplified signal to the antenna unit 350 to radiate it into the air in the form of an electromagnetic wave.

Figure 9A:
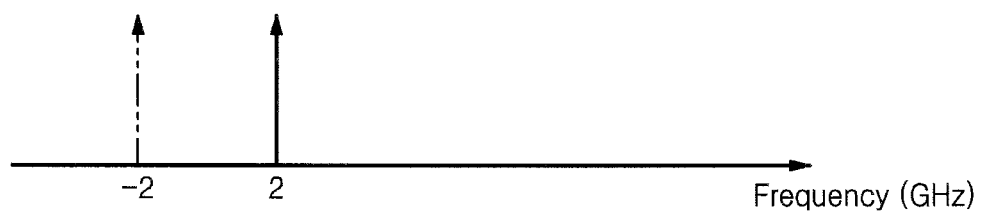
FIG. 9A is a diagram that conceptually illustrates a method of upconverting a frequency by using the transmitter for wireless communications of FIG. 8 according to an exemplary embodiment of the present disclosure.
Figure 9B:
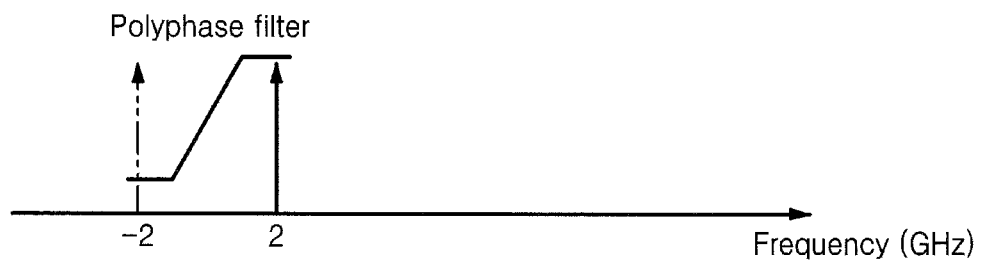
FIG. 9B is another diagram that conceptually illustrates the method of upconverting a frequency by using the transmitter for wireless communications of FIG. 8 according to an exemplary embodiment of the present disclosure.
Figure 9C:
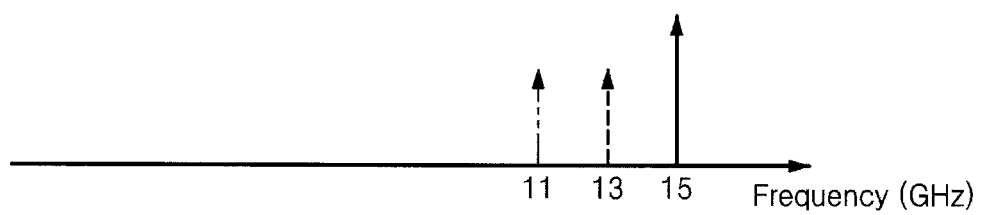
FIG. 9C is another diagram that conceptually illustrates the method of upconverting a frequency by using the transmitter for wireless communications of FIG. 8 according to an exemplary embodiment of the present disclosure.

FIGS. 9A to 9C are diagrams that conceptually illustrate a method of upconverting a frequency by using the transmitter for wireless communications of FIG. 8 according to an exemplary embodiment of the present disclosure.

In this exemplary embodiment, the frequency of +fa is 2 GHz, the frequency of −fa is 2 GHz, and the frequency of $f_{LO}$ is 13 GHz. When a signal having the image frequency of −2 GHz is input to the second filter unit 310, the second filter unit 310 suppresses the frequency component of −2 GHz and passes the frequency component of 2 GHz to deliver it to the mixer 320.

The mixer unit 320 mixes the signal received from the second filter unit 310 with the signal received from the local oscillation unit 330 to generate an output signal having the frequency of 15 GHz.

The second amplification unit 340 receives and amplifies the signal having the frequency of 15 GHz from the mixer unit 320 and radiates the amplified signal by the antenna unit 350.

The polyphase filter according to an exemplary embodiment of the present disclosure is a second-order polyphase filter consisting only of a resistive element R1 and a capacitive element C1. However, by using more resistive elements and capacitive elements, it is possible to increase the order to bring the spectrum of the filter closer to a desired shape.

While the technical idea of the present disclosure has been described with respect to the exemplary embodiment of the present disclosure, it is to be understood that various different modifications and combinations are possible by those skilled in the art without departing from the gist of the present disclosure. Accordingly, the exemplary embodiments described herein are merely illustrative and are not intended to limit the scope of the present disclosure. The technical idea of the present disclosure is not limited by the exemplary embodiments. The scope of protection sought by the exemplary embodiment of the present disclosure is defined by the appended claims and all equivalents thereof are construed to be within the true scope of the present disclosure.

What is claimed is:

1. A transmitter for wireless communications, comprising:
    a filter unit configured to selectively pass a first frequency band that is a first frequency band of an input signal and block a second frequency band that is a second frequency band of the input signal;
    a local oscillation unit configured to generate an oscillation signal having a predetermined oscillation frequency and a predetermined magnitude;
    a mixer unit configured to up-convert a filter signal output from the filter unit with the oscillation signal, and output an up-converted signal that has a frequency higher than the first frequency band;
    an amplification unit configured to amplify the mixed signal from the mixer unit; and
    an antenna unit configured to radiate the amplified mixed signal in the form of an electromagnetic wave.

2. The transmitter according to claim 1, wherein the first frequency band is one continuous frequency band above 500 MHz.

3. The transmitter according to claim 1, wherein the second frequency band is one continuous frequency band below 1 GHz.

4. The transmitter according to claim 3, wherein the first frequency band and the second frequency band are symmetric about a frequency on a frequency axis.

5. The transmitter according to claim 1, wherein the filter unit comprises a polyphase filter.

6. The transmitter according to claim 5, wherein the polyphase filter comprises a plurality of resistors and a plurality of capacitors.

7. The transmitter according to claim 5, wherein the polyphase filter receives two phase signals or four phase signals.

8. The transmitter according to claim 1, wherein the filter unit, the local oscillation unit, the mixer unit, the amplification unit and the antenna unit are implemented as a single chip.

* * * * *